May 16, 1933.  W. O. JONES  1,909,408
APPARATUS FOR SPROUTING AND GROWING GREEN FEED FOR POULTRY AND HOGS
Original Filed July 14, 1930  2 Sheets-Sheet 2
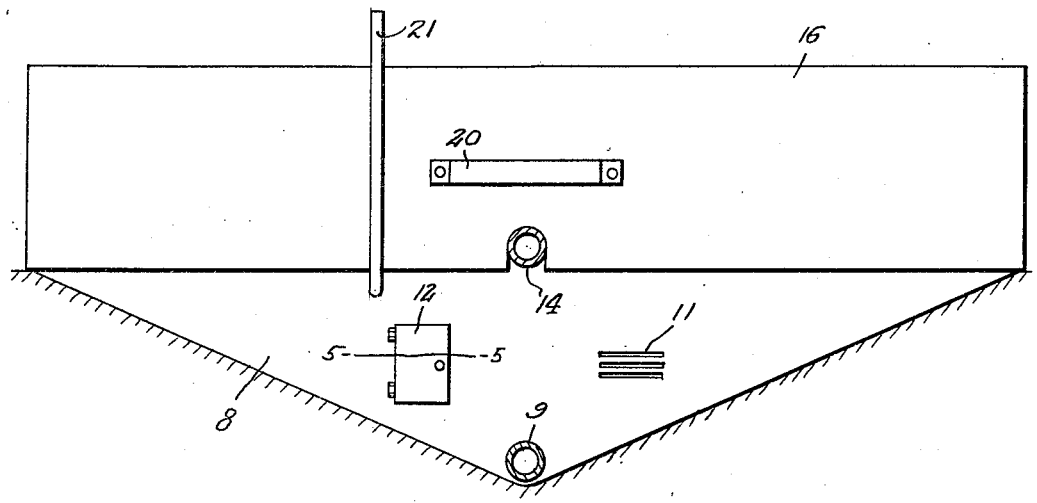
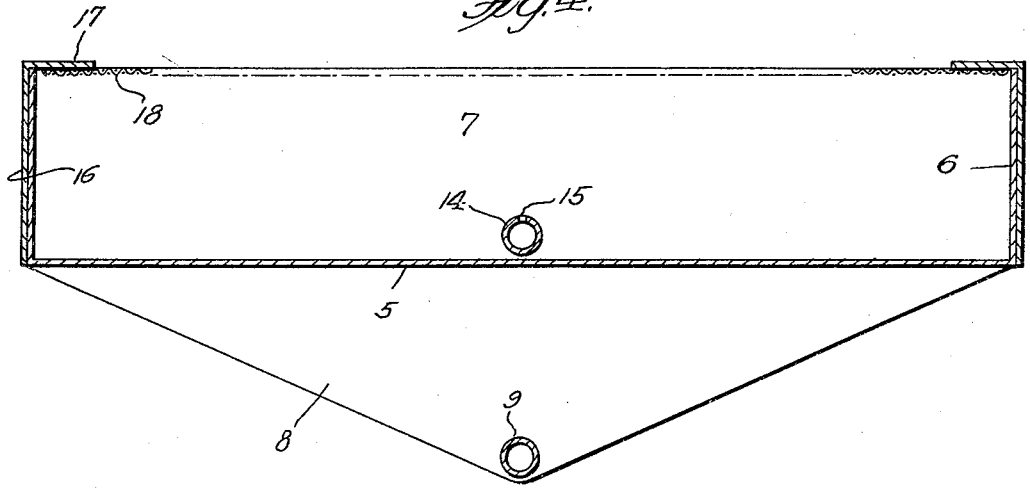
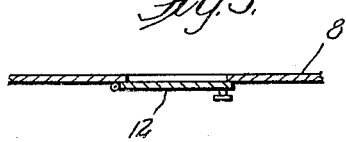
Inventor
William O. Jones,
By Clarence A. O'Brien
Attorney Patented May 16, 1933

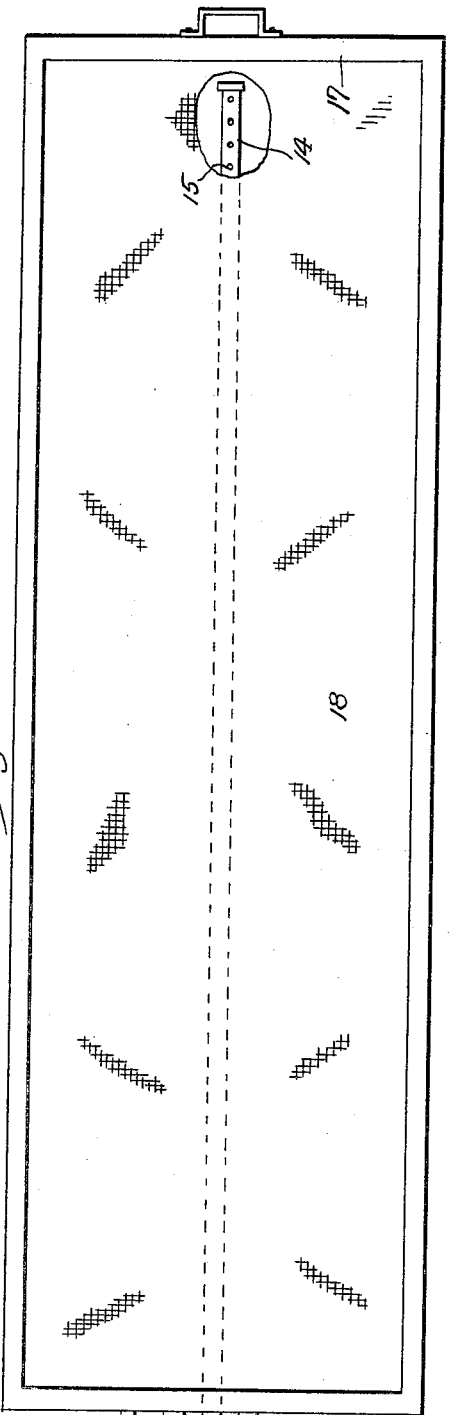
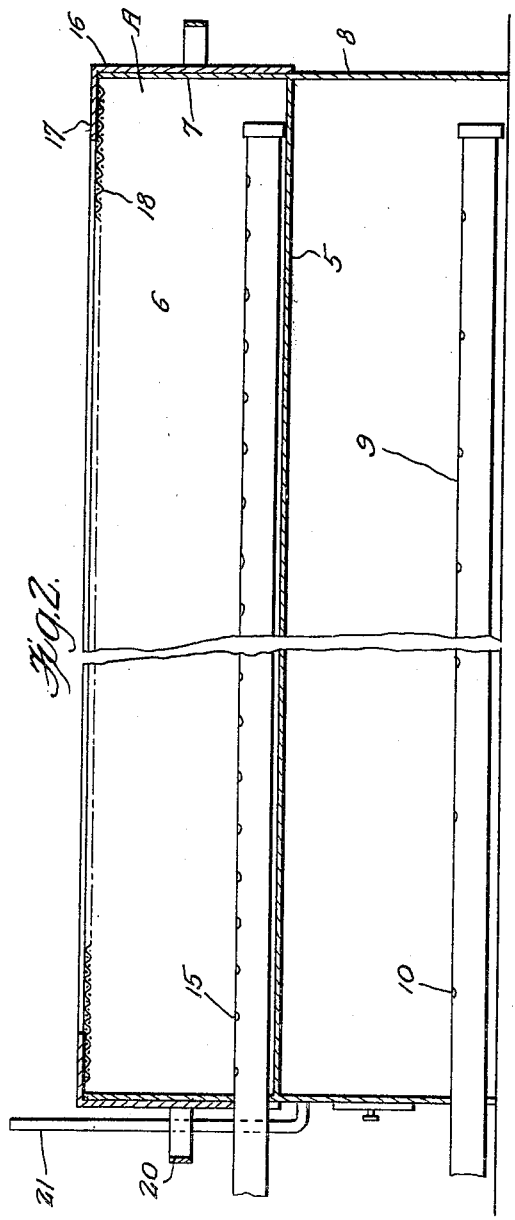

1,909,408

UNITED STATES PATENT OFFICE

WILLIAM O. JONES, OF ABILENE, TEXAS

APPARATUS FOR SPROUTING AND GROWING GREEN FEED FOR POULTRY AND HOGS

Application filed July 14, 1930, Serial No. 467,918. Renewed September 27, 1932.

The present invention relates to an apparatus for sprouting and growing green feed for poultry and hogs and an important object of the invention resides in the provision of an apparatus of this nature whereby grain and the like may be grown so as to provide feed for poultry and hogs.

Another very important object of the invention resides in the provision of an apparatus of this nature having means therein whereby the desired moisture and heat may be applied thereto.

A still further very important object of the invention resides in the provision of an apparatus of this nature which is exceedingly simple in construction, inexpensive to manufacture, strong and durable, compact and convenient in its arrangement of parts, thoroughly efficient and reliable in use and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a top plan view of the apparatus embodying the features of my invention, Figure 2 is a vertical longitudinal section therethrough, Figure 3 is an end elevation thereof, Figure 4 is a vertical transverse section therethrough, Figure 5 is a detail section taken substantially on the line 5—5 of Figure 3.

Referring to the drawings in detail it will be seen that the letter A denotes a box like structure and includes a bottom 5, longitudinal side walls 6, and end walls 7. Triangular walls 8 depend from the end walls 7 to form a compartment therebetween when these walls 8 are set in an opening in the ground with the bottom 5 substantially flush with the ground. A burner pipe 9 extends through one of the walls 8 and has jet openings 10 in the top thereof. One of the end walls 8 is provided with ventilating slots 11 and with a hingedly mounted door 12. A water pipe 14 extends through one of the end walls 7 along the bottom 5 and has outlet openings 15 in the top thereof. A feed bed is placed in the box like structure. A top comprises a box like structure 16 to telescope over the box like structure A and formed at its top with an internal flange 17 with screening 18 stretched thereacross and to set on top of the feed bed so that the plants will sprout therethrough to provide feed for the poultry, pigs and the like, yet preventing them from scratching or rooting in the bed which would destroy the roots.

Suitable handles 20 are provided on the ends of the cover so that the same may be raised and lowered easily. A pipe 21 extends from the heating chamber above the top of the device for the escape of the fumes from said heating chamber.

It is thought that the construction, utility and advantages of this invention will now be quite apparent to those skilled in this art without a more detailed description thereof.

However, it will be seen that when a trench is dug in the ground and the flanges 8 placed therein a heating chamber will be formed by said flanges and the bottom 5 of the device, the sides of the chamber being formed by the dirt walls of the trench. The trench should be large enough to extend beyond that wall 8 which is provided with the ventilating slots 11 and the door 12 so that access can be had to the door and air can enter from the exposed part of the trench through the slots 11. The burner pipe 9 is connected to a supply of gas or other fuel and the gas escaping through the perforations 10 will be ignited in any suitable manner through the door 12. The slots 11 will furnish air for combustion and the fumes will escape through the pipe 21.

The dirt to form the feed bed is placed in the casing A and the seed is planted in this dirt, moisture to be supplied to the seed through the perforations 15 in the water pipe 9. As the seed sprouts the plants will pass through the screen 18 so that the poultry or hogs can graze upon the sprouts which project above the screen though said screen will prevent the poultry or hogs reaching the feed bed. If the heating chamber is used, the heat will cause the seed to quickly germinate though the heating means need not be used when the weather is warm.

It will be seen that the feed bed may be kept properly moistened and at the desired temperature for proper efficiency. Of course the present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A device for furnishing green feed for poultry and the like comprising a casing having its top covered by a screen, the casing covering a seed bed whereby the plants will grow and pass through the screen where they are accessible to the poultry and animals, and a heating chamber located under the seed bed and containing heating means.

2. A device for furnishing green feed for poultry and the like comprising a casing having its top covered by a screen, the casing covering a seed bed whereby the plants will grow and pass through the screen where they are accessible to the poultry and animals, and a heating chamber located under the seed bed and containing heating means, and a perforated water pipe passing into the casing and through the seed bed.

3. A device for furnishing green feed for poultry and the like comprising a casing having a screen covering its top, dependent flanges at two sides of the casing for forming two walls of a heating chamber from a trench dug in the ground and over which the casing is placed, a burner in the heating chamber, means for supplying fuel to the same and a water pipe extending into the casing for furnishing moisture to the seed bed.

In testimony whereof I affix my signature.

WILLIAM O. JONES.